3,526,627
METHOD FOR PREPARATION OF QUINAZOLONES
Houston George Brooks, Jr., Somerset, N.J., assignor to American Cyanamid Company, Stamford, Conn., a corporation of Maine
No Drawing. Continuation-in-part of application Ser. No. 547,428, May 4, 1966. This application June 5, 1969, Ser. No. 830,863
Int. Cl. C07d 51/48
U.S. Cl. 260—251          7 Claims

ABSTRACT OF THE DISCLOSURE

Process for the preparation of quinazolones by reaction of a 3,1-aryl-oxazine-2,4-dione with an ortho hydroxy-substituted aromatic amide in the presence of a catalytic amount of a base at a temperature high enough to insure reaction but not so high as to cause product decomposition.

---

This application is a continuation-in-part of copending application Ser. No. 547,428, filed May 4, 1966, now abandoned.

This invention relates to an improved method for the preparation of quinazolones. More particularly, it relates to a method for the preparation of quinazolones of the Formula I:

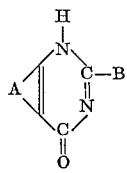

(I)

wherein A forms a benzo or naphtho radical; and B is an aromatic moiety having a hydroxyl radical ortho to the position of attachment to the quinazolone structure, and which can be substituted with substituents selected from the group consisting of hydroxy, lower alkyl, lower alkoxy and halo.

Several methods have been employed in the preparation of quinazolones. Such methods include the following:

(A) Reaction of an aroyl anilide with urethane (ethyl ester of aminoformic acid) in the presence of phosphorus pentoxide.

(B) Heating an anthranilamide with an aromatic aldehyde in the presence of a solvent to give an anil derivative which is then ring closed to a dihydroquinazolone in the presence of caustic. The dihydroquinazolone is then oxidized to the corresponding quinazolone. This may be illustrated by the following reaction scheme:

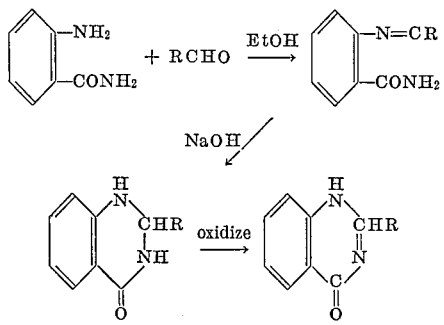

(C) By cyclization of N-aroyl anthranilamides under alkaline conditions.

In these methods, desired substituted derivatives may be obtained by using appropriately substituted starting materials.

While the methods given above may be employed to prepare the compounds of Formula I, none is capable of giving economical yields of high purity product. Thus, there exists the need for a preparative method whereby the desired products may be obtained in high yield and purity by an economical process that employs readily attainable starting materials and minimizes or eliminates other difficulties associated with known preparative methods.

It has now been discovered that the compounds of Formula I are readily produced in high yield and purity while overcoming difficulties associated with known processes by reacting in the presence of base and solvent, an anhydride of the formula:

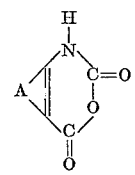

(II)

wherein A is as defined in Formula I, with an aromatic amide of the Formula III:

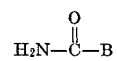

(III)

wherein B is as defined above. The term "aromatic moiety" as used herein in defining B is intended to encompass aromatic carbocyclic and heterocyclic rings capable of resonance stabilization, together with fused compounds thereof or with alicyclic rings. It is considered critical, however, that the o-hydroxyl radical found in B above and the carbamyl radical of Formula III be attached to a resonance stabilized ring.

This result is surprising in view of the fact that in the absence of the o-hydroxyl radical found in B as defined above, the desired quinazolones are not formed. It is also surprising in view of the fact that aliphatic amides regardless of substituents present, fail to give quinazolones.

While the exact reaction mechanism is not known, it is believed that the presence of the hydroxyl substituent in B of compound of Formula III, may produce a resonance effect in said compound under the influence of base such that the compound is more amine-like and less amide-like in its reactivity and consequently enters into the desired reaction. The fact that compounds similar to those of Formula III, but with the hydroxyl radical in the meta position, do not form quinazolones, tends to support the suggested reaction mechanism. It is not intended that the scope of this invention is to be limited by this theory which is given for informational purposes only.

The general reaction of this invention may be typified by the following equation wherein isatoic anhydride and salicylamide, the simplest examples of compounds of Formulas II and III are shown:

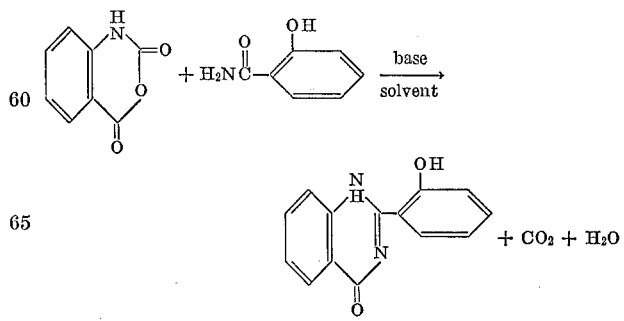

In carrying out the process of the present invention, the amide of Formula III can be first dissolved in an appropriate solvent. The anhydride of Formula II may then be added, followed by addition of base. The stirred mixture is heated for sufficient time and cooled. The product which separates is collected by suitable means, washed and finally dried.

The order of addition of the starting materials is not critical. Either may be added first or both may be added simultaneously to the solvent. The base catalyst generally is added last and preferably, but not critically, after the reactants have dissolved.

A solvent is generally necessary to serve as a reaction medium because of the high melting points of the starting materials. The solvent should be inert and capable of dissolving the reactants to a reasonable extent and, preferably, it should dissolve the product to a lesser extent. The amount of solvent required will vary widely, but preferably will be sufficient to dissolve the starting materials at the reaction temperature. Among the solvents that may be employed, there may be named such polar inert liquids as dimethylformamide, diethylformamide, dimethyl acetamide, methyl ethyl ketone, methyl isobutyl ketone, dimethyl sulfoxide, etc., as well as mixtures thereof.

The alkali or base employed in the reaction may be of either inorganic or organic type. Among the inorganic type are included oxides, hydroxides, carbonates, etc., of alkali and alkaline earth metals such as for example, sodium hydroxide, potassium carbonate, lithium hydroxide, calcium oxide, calcium hydroxide, barium hydroxide and the like. Among the organic type are included quaternary ammonium bases such as tetramethyl ammonium hydroxide, tetraethyl ammonium hydroxide, etc., as well as compounds such as pyridine, piperazine, tertiary amines, alkoxides, etc. It is also possible to employ combinations of bases of either or both types. The amount of base employed may vary widely. However, in the interests of economy and efficiency, it is preferred to use the base in catalytic quantities. Such amounts may vary from about 0.1 to about 20 mole percent, preferably 0.25 to 10 mole percent.

The mole ratio of anhydride to amide may also be varied, but it is generally preferred to use a ratio of 1:1, since no particular benefits result from using an excess of either one and product purity may be diminished.

The reaction temperautre also may vary over wide limits, but should be high enough to insure reaction, but not so high as to cause product decomposition. Carbon dioxide is liberated during the reaction. The temperature used should be such as to provide a controlled rate of liberation of carbon dioxide and may require some adjustment, particularly in the later stages of the reaction. Generally, the reaction temperature will be in the range of about 70 to 130° C., preferably 90 to 110° C.

The time of reaction will be influenced by such variables as reaction temperature, specific reactants, catalyst, reaction medium, etc. Liberation of carbon dioxide may be used to determine reaction progress. When carbon dioxide liberation ceases and is not restored with additional moderate heating, generally, the reaction is complete. Times of from about 0.5 to about 4 hours are generally applicable.

When the reaction is complete, the reaction mixture is cooled and the product recovered by usual procedures, e.g. crystallization and filtration. The product is generally washed with suitable solvent to increase purity, and then subsequently dried.

The anhydrides of Formula II are 4H-3, 1-oxazine-2,4-(1H)diones containing benzo or naphtho rings and substituents are numbered as follows:

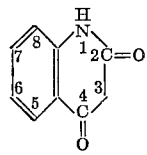

4H-3,1-benzoxazine-2,4(1H)-diones and

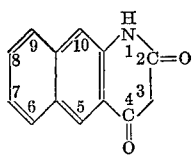

4H-3,1-naphthoxazine-2,4(1H)-diones

Among the anhydrides typified by the above formulae, may be named the following halo, nitro, lower alkyl, sulfo or lower alkoxy substituted 4H-3,1-benzoxazine-2,4-(1H)-diones (or isatoic anhydrides).

6-chloro-
6-nitro-
5-methyl-
5-methyl-6-chloro
5-nitro-
7-chloro-
8-methyl-

In addition to unsubstituted 4H-3,1-naphthoxazine-2,4-(1H)-dione, the following substitution products thereof may also be named as representative of naphthoxazines which can be converted by this invention:

5-methyl-
5,6-dimethyl, etc.

The present invention is capable of converting similar oxazines wherein the benzo or naphtho radicals are replaced by or fused with other carbocyclic or hetero ring systems.

Among the amides of Formula III which may be employed in the present invention are carbocyclic amides such as salicylamide (2-hydroxy-benzamide), or hydroxy, lower alkyl, lower alkoxy, halo substitution products thereof, such as 2,4-dihydroxybenzamide, 2-hydroxy-4-ethoxybenzamide, 2,3-dihydroxybenzamide, 2-hydroxy-4-methylbenzamide, 2 - hydroxy-3-methylbenzamide, 2-hydroxy-3,4-dimethylbenzamide, 2-hydroxy - 4 - chlorobenzamide; alpha and beta hydroxynaphthamides, such as 2-hydroxy-1-naphthamide, 1 - hydroxy-2-naphthamide, 2,4-dihydroxy-1-naphthamide, and other naphthamides including halo, lower alkyl, and lower alkoxy substitution products thereof, such as 2-hydroxy-4-chloro-1-naphthamide, 2-hydroxy-4-methyl-1-naphthamide, 2 - hydroxy-4-ethoxy-1-naphthamide; benzamides and naphthamides, as described above, wherein there is fused thereto an alicyclic or heterocyclic ring, such as 1-hydroxy-5,6,7,8-tetrahydro-2-naphthamide, 2 - hydroxy-5,6,7,8-tetrahydro-1-naphthamide, 5-hydroxy-6-quinoline carboxamide, 4-hydroxy-5-benzofuran carboxamide, 4 - hydroxy - 5 - benzothiophene carboxamide, and hydroxy, lower alkyl, lower alkoxy, or halo derivatives thereof; heterocyclic amides, such as 4-hydroxy-3-quinoline carboxamide, 2-hydroxy-3-benzofuran carboxamide, 2-hydroxy-3-benzothiophene carboxamide, and lower alkyl, lower alkoxy, or halo derivatives thereof.

The quinazolones prepared by the process of this invention are useful as solid organic luminescers as disclosed in U.S. Pat. No. 3,169,129, and this invention is useful for preparing all the quinazolones disclosed in that patent.

This invention is more fully illustrated by the following examples wherein parts and percentages are on a weight basis unless otherwise specified.

EXAMPLE 1

Preparation of 2-(2-hydroxyphenyl)-4(3H)-quinazolone

To a stirred solution of 68.6 parts (0.5 mole) of salicylamide in 200 ml. of dimethyl formamide was added 81.6 parts (0.5 mole) of isatoic anhydride [4H-3,1-benzoxazine-2,4(1H)-dione]. The mixture was heated to 90–100° C. and 0.1 to 0.2 part of sodium hydroxide (5.0 to 10.0 mole percent) was added. The stirred mixture was maintained at this temperature during a period of two hours, then cooled to 70° C. and the product which separated was filtered, washed with cold dimethyl formamide and then acetone and dried. 96 parts of product which melted at 298–300° C. was obtained. The yield was 80.6% of theory.

EXAMPLE 2
Preparation of 2-(2-hydroxyphenyl)-6-chloro-4(3H) quinazolone

Folowing the procedure of Example 1 but substituting for the benzoxazinedione derivative, 98.85 parts of 6-chloro-4H-3,1-benzoxazine-2,4(1H)-dione, there was obtained the desired product of melting point 336–338° C.

EXAMPLE 3
Preparation of 2-(2-hydroxyphenyl)-6-nitro-4(3H)quinazolone

Following the procedure of Example 1 but substituting for the benzoxazinedione derivative, 104.1 parts of 6-nitro-4H-3,1-benzoxazine-2,4(1H)-dione, there was obtained the desired product which darkened on heating at 270° C. and decomposed without melting below 375° C.

EXAMPLE 4
Preparation of 2-(2-hydroxy-4-ethoxyphenyl)-4(3H)quinazolone

Following the procedure of Example 1 but substituting for the salicylamide 90.6 parts of 2-hydroxy-4-ethoxy-benzamide there was obtained the desired product which melted at 301–303° C.

EXAMPLE 5
Preparation of 2-(2,4-dihydroxyphenyl)-4(3H)quinazolone

Following the procedure of Example 1 but substituting for the salicylamide 76.6 parts of 2,4-dihydroxybenzamide, there was obtained the desired product.

EXAMPLE 6
Preparation of 2-[2-(1-hydroxy-5,6,7,8-tetrahydronaphthyl)]-4(3H)quinazolone Following the procedure of Example 1 but substituting for the salicylamide 95.5 parts of 1-hydroxy-5,6,7,8-tetrahydro-2-naphthamide, there was obtained the desired product.

EXAMPLE 7
Preparation of 2-[5-(4-hydroxy-benzofuranyl)]-4(3H)quinazolone

Following the procedure of Example 1 but substituting for the salicylamide 88.5 parts of 4-hydroxy-5-benzofurancarboxamide, there was obtained the desired product.

EXAMPLE 8
Preparation of 2-[3-(2-hydroxybenzothiophenyl)]-4(3H)quinazolone

Following the procedure of Example 1 but substituting for the salicylamide 90.5 parts of 2-hydroxy-3-benzothiophene carboxamide, there was obtained the desired product.

EXAMPLE 9
Preparation of 2-[3-(4-hydroxy-8-chloroquinolyl)]-4(3H)quinazolone To a stirred mixture of 1.6 g. (0.01 mole) of isatoic anhydride, 2.2 g. (0.01 mole) of 4-hydroxy-8-chloro-3-quinoline-carboxamide and 7-ml. of dimethylformamide heated at 85–90° C., there was added 2 drops of 50% sodium hydroxide and the stirred mixture was maintained at this temperature for a total of 20 hours. The solid which separated was collected on a filter and washed with dimethylformamide, then with methanol. The yield of the air dried product was 0.3 g (9.4%). The product did not melt below 400° C.

EXAMPLE 10
Preparation of 2-(2-hydroxyphenyl)-4(3H)quinazolone employing various bases A stirred mixture of 27.4 g. (0.2 mole) of salicylamide, 32.6 g. (0.2 mole) of isatoic anhydride, the appropriate base in the quantity indicated below and 100 ml. of dimethylformamide was heated at 85–95° C., during a period of three hours. The mixture was allowed to cool to 45° C, and the crystalline product which separated during the reaction period was collected on a filter with suction and washed with 100 ml. of dimehtylformamide and then with 150 ml. of acetone, then air dried.

| Amount of base used | Base | Yield Grams | Percent |
| --- | --- | --- | --- |
| 0.5 g | Sodium methoxide | 29.3 | 61.6 |
| 2 ml | Trimethylbenzylammonium hydroxide (35% in methanol) | 15.3 | 32.1 |
| 0.5 g | Barium hydroxide | 23.8 | 50.0 |
| 5 ml | Triethylamine | 36.1 | 75.8 |
| 0.5 g | Sodium bicarbonate | 35.0 | 73.6 |
| 5 ml | Pyridine | 5.0 | 10.5 |
| 0.5 g | Calcium hydroxide | 24.0 | 50.4 |
| 0.5 g | Calcium oxide | 25.0 | 52.4 |
| None | None | None | |

EXAMPLE 11
Preparation of various substituted quinazolones

Following the procedure of Example 1, using the indicated amounts of starting materials, the compounds listed in Table I were obtained in the yields indicated.

TABLE I.—VARIOUS SUBSTITUTED QUINAZOLONES

| | Yield, percent | Melting point, ° C. |
| --- | --- | --- |
| 2-(2-hydroxy-3-methylphenyl)-4 (3H) quinazolone: 2-hydroxy-3-methylbenzamide, 15.2 parts (0.1 mole) / Isatoic anhydride, 16.7 parts (0.1 mole) | 60 | 286–7 |
| 2-(2-hydroxy-3-methylphenyl)-6-chloro-4 (3H) quinazolone: 2-hydroxy-3-methylbenzamide, 15.2 parts (0.1 mole) / 6-chloroisatoic anhydride, 19.8 parts (0.1 mole) | 28 | >360 |
| 2-(2-hydroxy-3-methylphenyl)-6-nitro-4 (3H) quinazolone: 2-hydroxy-3-methylbenzamide, 15.2 parts (0.1 mole) / 6-nitroisatoic anhydride, 20.7 parts (0.1 mole) | 40 | >360 |
| 2-(2-hydroxy-3,5-dichlorophenyl)-4 (3H) quinazolone: 2-hydroxy-3,5-dichlorobenzamide, 20.6 parts (0.1 mole) / Isatoic anhydride, 16.7 parts (0.1 mole) | 33 | >250 |
| 2-(2-hydroxy-3,5-dichlorophenyl)-6-chloro-4 (3H) quinazolone: 2-hydroxy-3,5-dichlorobenzamide, 20.6 parts (0.1 mole) / 6-chloroisatoic anhydride, 19.8 parts (0.1 mole) | 71 | >360 |
| 2-(2-hydroxy-3,5-dichlorophenyl)-6-nitro-4 (3H) quinazolone: 2-hydroxy-3,5-dichlorobenzamide, 20.6 parts (0.1 mole) / 6-nitroisatoic anhydride, 20.7 parts (0.1 mole) | 91 | >360 |
| 2-(2-hydroxy-5-chlorophenyl)-4 (3H) quinazolone: 5-chlorosalicylamide, 5.1 parts (.03 mole) / Isatoic anhydride, 4.9 parts (.03 mole) | 71 | >350 |
| 2-(2-hydroxy-5-chlorophenyl)-6-nitro-4 (3H) quinazolone: 5-chlorosalicylamide, 8.5 parts (.05 mole) / 6-nitroisatoic anhydride, 10.5 parts (.05 mole) | 44 | >350 |
| 2-(2-hydroxy-5-chlorophenyl)-6-chloro-4 (3H) quinazolone: 5-chlorosalicylamide, 8.5. parts (0.5 mole) / 6-chloroisatoic anhydride, 9.8 parts (0.5 mole) | 60 | >350 |
| 2-(2-hydroxy-3-naphthyl)-4 (3H) quinazolone: 2-hydroxy-3-naphthamide, 18.7 parts (0.1 mole) / Isatoic anhydride, 16.3 parts (0.1 mole) | 71 | >350 |
| 2-(-hydroxy-3-naphthyl)-6-chloro-4 (3H) quinazolone: 2-hydroxy-3-naphthamide, 18.7 parts (0.1 mole) / 6-chloroisatoic anhydride, 19.7 parts (0.1 mole) | 68 | >350 |
| 2-(2-hydroxy-3-naphthyl)-6-nitro-4 (3H) quinazolone: 2-hydroxy-3-naphthamide, 18.7 parts (0.1 mole) / 6-nitroisatoic anhydride, 20.7 parts (0.1 mole) | 85 | >350 |
| 2-(2-hydroxy-5-iodophenyl)-4 (3H) quinazolone: 5-iodosalicylamide, 13.1 parts (.05 mole) / Isatoic anhydride, 8.2 parts (.05 mole) | 50 | 333–335 |

TABLE I.—VARIOUS SUBSTITUTED QUINAZOLONES

| | Yield, percent | Melting point, °C. |
|---|---|---|
| 2-(2-hydroxy-5-iodophenyl)-6-chloro-4 (3H) quinazolone: | | |
| 5-iodosalicylamide, 13.1 parts (.05 mole) } 6-chloroisatoic anhydride, 9.8 parts (.05 mole) } | 72 | >350 |
| 2-(2-hydroxy-5-iodophenyl)-6-nitro-4 (3H) quinazolone: | | |
| 5-iodosalicylamide, 13.1 parts (.05 mole) } 6-nitroisatoic anhydride, 10.4 parts (.05 mole) } | 63 | 342–344 |
| 2-(2-hydroxy-5-bromophenyl)-6-chloro-4 (3H) quinazolone: | | |
| 5-bromosalicylamide, 10.8 parts (05. mole) } 6-chloroisatoic anhydrode, 9.8 parts (.05 mole) } | 76 | >350 |
| 2-(2-hydroxy-5-bromophenyl)-6-nitro-4(3H) quinazolone: | | |
| 5-bromosalicylamide, 10.8 parts (.05 mole) } 6-nitroisatoic anhydride, 10.4 parts (.05 mole) } | 83 | >350 |
| 2-(2-hydroxy-4-ethoxyphenyl)-6-chloro-4(3H) quinazolone: | | |
| 2-hydroxy-4-ethoxybenzaminde, 18.1 parts (0.1 mole) } 6-chloroisatoic anhydride, 19.7 parts (0.1 mole) } | 50 | 328–331 |
| 2-(1-hydroxy-2-naphthyl)-4(3H) quinazolone: | | |
| 1-hydroxy-2-naphthamide, 18.7 parts (0.1 mole) } Isatoic anhydride, 16.3 parts (0.1 mole) } | 31 | 324–326 |
| 2-(1-hydroxy-2-naphthyl)-6-chloro-4(3H) quinazolone: | | |
| 1-hydroxy-2-naphthamide, 9.4 parts (.05 mole) } 6-chloroisatoic anhydride, 9.8 parts (.05 mole) } | 30 | >350 |
| 2-(1-hydroxy-2-naphthyl)-6-nitro-4(3H) quinazolone: | | |
| 1-hydroxy-2-naphthamide, 18l7 patrs (0.1 mole) } 6-nitroisatoic anhydride, 20.7 parts (0.1 mole) } | 24 | >350 |
| 2-(2-hydroxy-4-ethoxyphenyl)-6-nitro-4(3H) quinazolone: | | |
| 2-hydroxy-4-ethoxybenzaminde, 9.1 parts (.05 mole) } 6-nitroisatoic anhydride, 10.4 parts (.05 mole) } | 63 | >350 |
| 2-(2,4-dihydroxyphenyl)-6-chloro-4(3H) quinazolone: | | |
| 2,4-dihydroxybenzamide, 15.3 parts (0.1 mole) } 6-chloroisatoic anhydride, 19.7 parts (0.1 mole) } | 31 | 332–334 |
| 2-(2,4-dihydroxypuenyl)-6-nitro-4(3H) quinazolone: | | |
| 2,4-dihydroxybenzamide, 15.3 parts (0.1 mole) } 6-nitroisatoic anhydride, 20.7 parts (0.1 mole) } | 33 | >340 |
| 2-(2-hydroxy-3,5-dibromophenyl)-6-chloro-4(3H) quinazolone: | | |
| 3,5-dibromosalicylamide, 14.7 parts (.05 mole) } 6-chloroisatoic anhydride 9.8 parts (.05 mole) } | 24 | >350 |
| 2-(2-hydroxy-3,5-dibromophenyl)-6-nitro-4(3H) quinazolone: | | |
| 3,5-dibromosalicylamide 14.7 parts (.05 mole) } 6-nitroisatoic anhydride 10.4 mparts (.05 mole) } | 23 | >350 |
| 2-(2-hydroxy-3-phenylphenyl)-4(3H) quinaxolone: | | |
| 3-phenylsalicylamide 10.6 parts (.05 mole) } Isatoic anhydride 8.2 parts (.05 mole) } | 33 | 321–323 |
| 2-(2,5-dihydroxyphenyl)-4(3H) quinazolone: | | |
| 2,5-dihydroxybenzamide 15.3 parts (.1 mole) } Isatoic anhydride 16.3 parts (.1 mole) } | 21 | 331–332 |
| 2-(2,5-dihydroxyphenyl)-6-chloro-4(3H) quinazolone: | | |
| 2,5-dihydroxybenzamide, 15.3 parts (.1 mole) } 6-chloroisatoic anhydride, 19.7 parts (.1 mole) } | 25 | 311–313 |
| 2-(2,5-dihydroxyphenyl)-6-nitro-4 (3H) quinazolone: | | |
| 2,5-dihydroxybenzamide, 15.3 parts (.1 mole) } 6-nitroisatoic anhydride, 20.6 parts (.1 mole) } | 18 | >350 |

What is claimed is:

1. A method for the preparation of quinazolines of the formula:

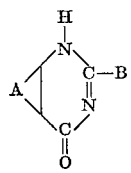

wherein A is a benzo or naphtho radical which can be substituted with substituents selected from the group consisting of halo, nitro, lower alkyl, sulfo and lower alkoxy; B is an aromatic moiety having a hydroxyl radical ortho to the position of attachment to the quinazolone structure, and which can be substituted with substituents selected from the group consisting of hydroxy, lower alkyl, lower alkoxy and halo;

said method comprising reacting, in an inert polar solvent, a 3,1-aryl-oxazine-2,4-dione with an ortho hydroxy-substituted aromatic amide in the presence of a catalystic amount of a base at a temperature high enough to insure reaction but not so high as to cause product decomposition; and recovering the quinazolone thus formed.

2. The method of claim 1 wherein the aromatic amide is salicylamide.

3. The method of claim 1 wherein the oxazine is isatoic anhydride.

4. The method of claim 1 wherein the base is sodium hydroxide.

5. The method of claim 1 wherein the solvent is dimethylformamide.

6. A method for the preparation of quinazolones of the formula:

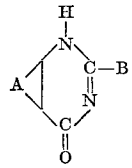

wherein A is a benzo or naphtho radical which can be substituted with substituents selected from the group consisting of halo, nitro, lower alkyl, sulfo and lower alkoxy; B is an aromatic moiety having a hydroxyl radical ortho to the position of attachment to the quinazolone structure, and which can be substituted with substituents selected from the group consisting of hydroxy, lower alkyl, lower alkoxy and halo;

said method comprising reacting, in an inert polar solvent, a 3,1-aryl-oxazine-2,4-dione with an ortho hydroxy-substituted aromatic amide, said oxazine and aromatic amide being reacted in equimolar amounts at a temperature in the range of 70°–130° C. in the presence of a catalytic amount of a base; and recovering the quinazolone thus formed after the evolution of carbon dioxide has substantially ceased.

7. The method of claim 6 wherein the aromatic amide is of the formula:

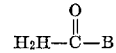

wherein B is an aromatic moiety having a hydroxyl radical ortho to the position of attachment to the quinazolone structure, and which can be substituted with substituents selected from the group consisting of hydroxyl, lower alkyl, lower alkoxy, and halo.

References Cited

UNITED STATES PATENTS 3,169,129   2/1965   Rodgers et al. _____ 260—251

ALEX MAZEL, Primary Examiner

R. V. RUSH, Assistant Examiner

U.S. Cl. X.R.

252—301.2

UNITED STATES PATENT OFFICE
CERTIFICATE OF CORRECTION

Patent No. 3,526,627            Dated September 1, 1970

Inventor(s) Houston George Brooks, Jr.

It is certified that error appears in the above-identified patent and that said Letters Patent are hereby corrected as shown below:

Column 2 line 65, the portion of the formula reading

      should read      

Column 3 line 72, and column 4 line 5, the portions of the formulae reading

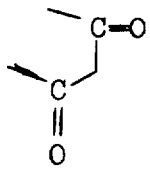      should read      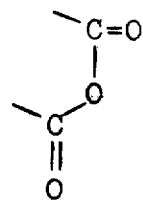

Column 4 line 16, --6-sulfo-- should be inserted below "6-nitro". Column 6 line 49 ">250" should read -->350--. Column 7 line 25 "1817 patrs" should read --18.7 parts--; line 29 "2-hydroxy-4-ethoxybenzaminde" should read --2-hydroxy-4-ethoxybenzamide--; line 34 "2-(2,4-dihydroxypuenyl)-6-nitro-4(3H)" should read --2-(2,4-dihydroxyphenyl)-6-nitro-4(3H)--; line 53 "quinazolines" should read --quinazolones--. Column 8 line 50, the formula should read

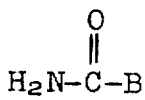

SIGNED AND
SEALED
NOV 17 1970

(SEAL)
Attest:

Edward M. Fletcher, Jr.
Attesting Officer

WILLIAM E. SCHUYLER, JR.
Commissioner of Patents